United States Patent
Braun et al.

(10) Patent No.: US 6,865,884 B2
(45) Date of Patent: Mar. 15, 2005

(54) OPERATING METHOD FOR AN INTERNAL COMBUSTION ENGINE WHICH OPERATES WITH AN EXHAUST-GAS AFTERTREATMENT SYSTEM

(75) Inventors: Tillmann Braun, Berglen (DE); Georg Huthwohl, Soest (DE)

(73) Assignees: DaimlerChrysler AG, Stuttgart (DE); PUReM Abgassysteme GmbH & Co. KG, Menden (DE)

(\*) Notice: Subject to any disclaimer, the term of this patent is extended or adjusted under 35 U.S.C. 154(b) by 0 days.

(21) Appl. No.: 10/393,342

(22) Filed: Mar. 21, 2003

(65) Prior Publication Data

US 2004/0011030 A1 Jan. 22, 2004

(30) Foreign Application Priority Data

Mar. 23, 2002 (DE) .......................................... 102 13 170

(51) Int. Cl.$^7$ ................................................ F01N 3/00
(52) U.S. Cl. .............................. 60/295; 60/274; 60/286; 60/303
(58) Field of Search .......................... 60/274, 286, 295, 60/297, 303, 311

(56) References Cited

U.S. PATENT DOCUMENTS

| | | | | |
|---|---|---|---|---|
| 4,969,328 A | * | 11/1990 | Kammel | .................. 60/275 |
| 5,822,977 A | * | 10/1998 | Fukuda et al. | ................ 60/274 |
| 6,405,528 B1 | * | 6/2002 | Christen et al. | ............. 60/295 |
| 6,438,948 B2 | * | 8/2002 | Ono et al. | .................. 60/311 |
| 6,497,095 B2 | * | 12/2002 | Carberry et al. | ............. 60/295 |
| 6,622,480 B2 | * | 9/2003 | Tashiro et al. | ............... 60/295 |

FOREIGN PATENT DOCUMENTS

| | | |
|---|---|---|
| EP | 0115722 B1 | 9/1986 |
| EP | 1028235 A2 | 8/2000 |

\* cited by examiner

*Primary Examiner*—Binh Q. Tran
(74) *Attorney, Agent, or Firm*—Crowell & Moring LLP

(57) ABSTRACT

In an operating method for internal combustion engines which operate with exhaust-gas aftertreatment systems, in particular diesel internal combustion engines, a plurality of operating programs are used. The first of these programs, as an initial stage, works on the basis of automatic regeneration. The second of these programs provides measures which assist regeneration, for example by increasing the exhaust-gas temperature, in the event of conditions which are unfavourable for regeneration, for example on account of unfavourable driving cycles. The third of these programs has the purpose of reactivating the damaged components in the event of non-irreversible damage to the components of the exhaust-gas system.

22 Claims, 3 Drawing Sheets

OPERATING METHOD FOR AN INTERNAL COMBUSTION ENGINE WHICH OPERATES WITH AN EXHAUST-GAS AFTERTREATMENT SYSTEM

This application claims the priority of German application 102 13 170.8, filed Mar. 23, 2002, the disclosure of which is expressly incorporated by reference herein.

BACKGROUND AND SUMMARY OF THE INVENTION

The present invention relates to an operating method for an internal combustion engine which operates with an exhaust-gas aftertreatment system, and in particular for an internal combustion engine which is operated with diesel fuel, in which a plurality of operating programs, which can be used in a step sequence, are used for the exhaust-gas aftertreatment system operating with a particle filter. The particle filter is regenerated as a function of its loading and is monitored for when a limit loading is exceeded. A support program is used for regeneration of the particle filter with a temperature increase of the exhaust gases fed to the particle filter.

An operating method of this type which operates in multiple stages is known from European publication EP 1 028 235 A2. In this operating method, an unladen particle filter is provided in a starting state and, proceeding from this state, two special operating programs are used. The first special operating program is activated when the loading of the particle filter is so great that it needs to be regenerated. This first special operating program operates by intervening in the control of the internal combustion engine in such a manner that the exhaust-gas temperature is increased, i.e. the internal combustion engine operates with worse efficiency, and/or with an additional heating device.

The second special operating program is activated when previous measures have not worked and the degree of loading has risen beyond the acceptable loading which initiates activation of the first special operating program, i.e. the particle filter is overloaded. This second special operating program provides for the measures of the first special operating program to be made more intensive, i.e. for the exhaust-gas temperature to be increased further. For this purpose, operating states of the internal combustion engine in which extremely high exhaust-gas temperatures are reached, or high exhaust-gas temperatures are reached very quickly, are proposed.

If these measures do not succeed either, for example if the particle filter is blocked with ash or has been irreversibly damaged, for example as a result of the particle filter being broken or burnt through, fault indicators are provided and, to avoid damage to the internal combustion engine, if necessary, measures intervene in the internal combustion engine control in order to limit its power output.

Overall, therefore, in the known operating method, in each case working on the basis of the state of the particle filter, in each case only measures which relate to the particle loading of the particle filter per se and have the objective of burning off the particles by suitably increasing the temperature, are initiated.

Furthermore, it is known from European publication EP 0 115 722 B1, in an operating method for an internal combustion engine which operates with an exhaust-gas aftertreatment system which comprises a particle filter, to vary the controlled initiation, which is based on the degree of loading of the particle filter, of the regeneration of this filter in terms of the initiation time, i.e. the loading threshold, as a function of operating states of the internal combustion engine, with the speed and loading of the engine being provided as control variables.

The invention is based on the object of extending an operating method of the type described in the introduction with regard to the possibilities of influencing factors which have an influence on the regeneration and thereby of improving the functionality of the operating method.

In the context of the invention, this is achieved by an operating method in which a reactivation program is used for components which are associated with the exhaust-gas aftertreatment system in addition to the particle filter when successive, preceding and successful activations of the support program occur at a frequency greater than a predetermined limit frequency. The function of the components of the exhaust-gas aftertreatment system which comprises the particle filter is taken into account when determining the method steps and, if necessary, the regeneration of the particle filter is influenced by means of reactivation of the components of the exhaust-gas aftertreatment system. The basis of this is that, in the event of a predetermined loading limit being exceeded, regeneration can generally be brought about by means of a support program for the regeneration, which uses a temperature increase for the exhaust gases, if, on account of special conditions, the automatic regeneration is disrupted and the result is a higher level of loading which is critical as a limit loading.

Examples of factors which have an adverse effect on the automatic regeneration of the exhaust-gas aftertreatment system are driving cycles which, depending on the corresponding operating performance of the internal combustion engine, lead to lower exhaust-gas temperatures, so that it is no longer possible for temperatures which initiate the regeneration to be reached by means of the components of the exhaust-gas aftertreatment system, which have a significant role in determining the response of the regeneration in the automatic regeneration mode.

Examples of components of influence in the exhaust-gas aftertreatment system are, in the case of what are known as CRT systems (continuously regenerating trap systems), the oxidation catalytic converter which is mounted upstream of the particle filter and generally effects the continuous regeneration of the filter but the function of which may be adversely affected by accumulations of sulphur to such an extent that sufficient particle regeneration is no longer achieved. Further components which influence the particle ignition temperature and therefore the initiation of the regeneration are devices in which additives which correspond to the particular fuel and reduce the particle ignition temperature or in which the exhaust-gas temperature is increased by special measures upstream of the particle filter.

By recording the frequency of the successive instances in which the support program is successfully activated, it is possible, using the feedback in the operating method, to make a judgement as to whether system components of the exhaust-gas aftertreatment system have been irreversibly damaged, since in the event of irreversible damage a regeneration operation carried out after the limit loading has been achieved by activation of the support program cannot lead to the regeneration in turn proceeding automatically, but rather the regeneration has to be constantly initiated by activation of the support program. Accordingly, in the event of irreversible damage to the components, warnings to the driver and to the on-board diagnosis and also, if appropriate, an intervention in the control of the internal combustion engine (emergency driving mode) are required in order to rule out permanent damage, for example to the particle filter or the internal combustion engine.

However, the question of irreversible damage is preferably not only determined on the basis of whether the additional measures forming part of the support program have exceeded a limit frequency, but also the fact that the limit frequency has been exceeded is initially used to initiate reactivation of the components of the support program. If this reactivation does not lead to any improvement in the regeneration performance, the result is that the additional measures of the support program on the basis of which, when the limit frequency is exceeded, the reactivation program is initiated again, are constantly initiated. The repeated, successive initiation of the reactivation program is therefore proof of irreversible damage to the components, so that as a result of this information, as the method proceeds, the assessment of the limit frequency of the activation of the support program with regard to the initiation of the reactivation program is no longer performed, and the measures of the support program are instead used to carry out the regeneration with a view to operation of the internal combustion engine which if necessary is maintained as an emergency running mode.

Therefore, the operating method according to the invention is distinguished by a high level of accuracy in its self-diagnosis and ensures that both additional measures as part of the support program, but also in particular reactivation measures, are only initiated if they are absolutely necessary.

Further details and advantages of the invention will emerge from the claims. Furthermore, the invention is illustrated and explained in more detail below with reference to the drawings.

DETAILED DESCRIPTION OF THE INVENTION

The operating method according to the invention relates to an exhaust-gas aftertreatment system for a diesel internal combustion engine, in which a particle filter, which generally has a catalytic coating, is associated with the exhaust-gas aftertreatment system and also, as alternative or additional components, an oxidation catalytic converter, which is connected upstream of the particle filter and together with the particle filter forms what is known as a CRT system, and/or devices for metering quantities of additive to the fuel are associated with the exhaust-gas aftertreatment system, or additional measures, connected downstream of the internal combustion engine, are used to increase the exhaust-gas temperature. Solid particles, in particular soot, which have been filtered out of the exhaust-gas stream flowing over the particle filter are deposited on the filter surfaces, resulting in a loading which, if it can be burnt off, is broken down regeneratively by being burnt off. For this purpose, certain minimum temperatures are required as a function of the condition of the deposits, and these temperatures can be influenced by additives added to the fuel, the temperature profile given being dependent in particular also on the operating conditions of the internal combustion engine. If the limit temperature required for initiation of the regeneration is reached, the regeneration usually takes place automatically as part of the control work operation, so that critical loading limits are generally not reached.

Figure 1:
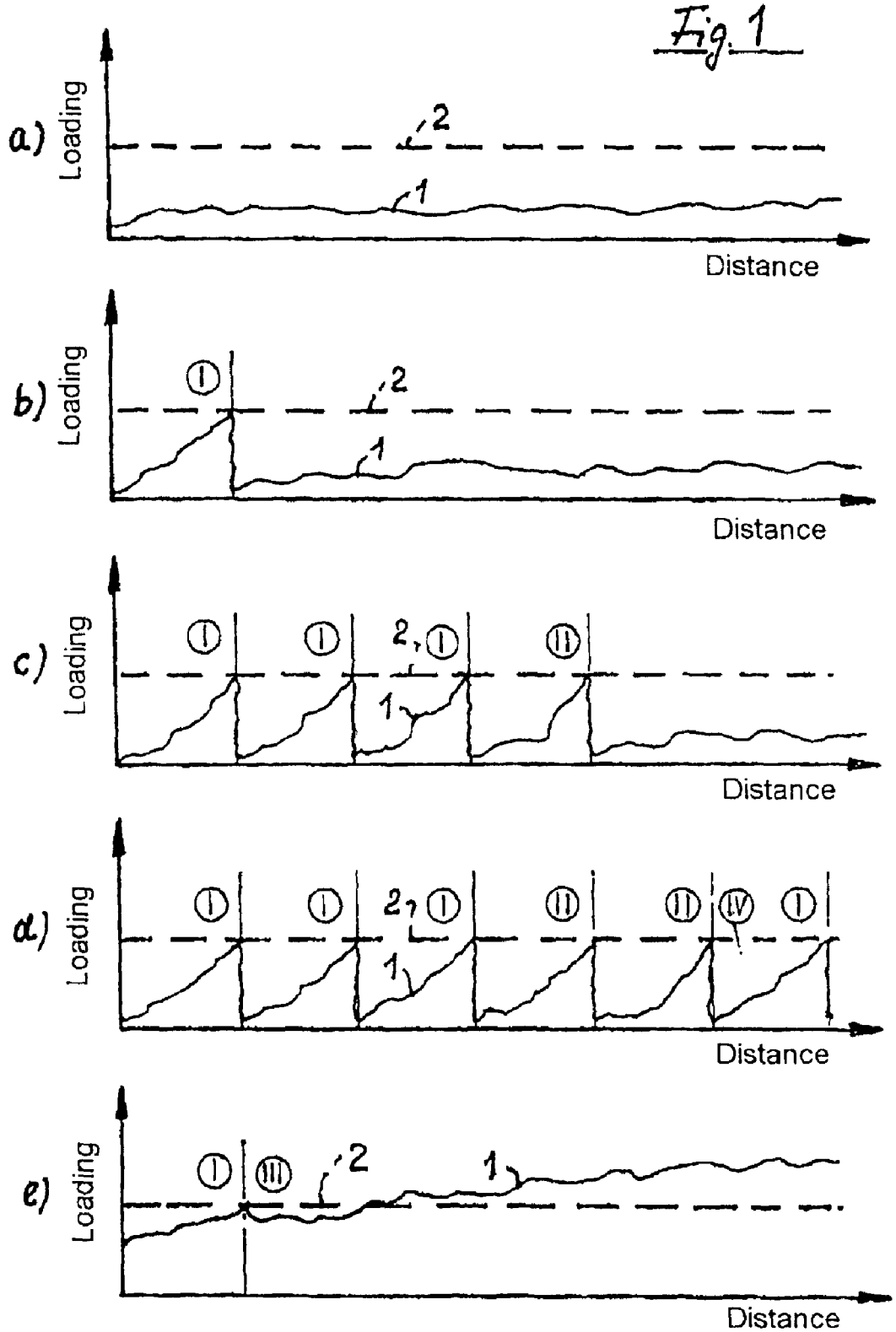
FIG. 1 shows loading states of the particle filter.

FIG. 1 illustrates various loading states, with a) illustrating the case which has been outlined above, namely the control work operation with automatic regeneration, so that the actual loading, which is illustrated by the solid line 1, remains below a limit loading 2, which is illustrated as a dashed line.

Working on the basis of this figure, the following figures under b) to e) illustrate various loading states in which corresponding method steps as part of the operating method according to the invention are assigned. These method steps are also referred to by I to IV in FIG. 2.

In the loading state as illustrated under b), unfavourable operating conditions, for example a driving cycle in which only low exhaust-gas temperatures are reached, for a certain period of time lead to operating conditions in which there is no automatic regeneration, and consequently the actual loading 1 rises to the limit loading 2. This initiates method step I, namely the activation of a support program, in which the exhaust-gas temperature is increased, for example by adjustment of the engine and/or by connecting up an additional burner, so that the regeneration takes place and, provided that there are suitable operating conditions in the internal combustion engine and that as a result the temperature profile is sufficient, automatic regeneration can continue to take place.

c) illustrates the situation in which, on account of the absence of automatic regeneration in successive intervals, the limit loading 2 is in each case reached, with the result that method step I is initiated. The increasing frequency of the need to activate the support program and thereby reduce the particle loading is regarded as a reason to initiate a method step II, namely reactivation of the components or checking of the components which, in control work mode, reduce the regeneration temperature. The reactivation consists, for example, in regenerating catalytic converters which have been poisoned by sulphur by establishing very high exhaust-gas temperatures or correcting the metering of additives within predetermined limits such that automatic regeneration is established again, as shown as c) continues.

In addition, d) illustrates the additional problem where method step II, even when it is repeated one or more times, has not achieved the objective, and thus the degree of loading cannot be kept permanently below the limit loading 2 irrespective of the execution of reactivation measures in accordance with method step II. From this, it can be inferred that the components have been irreversibly damaged, with the need to initiate a method step IV, namely the transmission of a warning to the on-board diagnosis of the vehicle in question or notification of the driver in some other way, and if appropriate also an intervention in the control of the internal combustion engine, so that the engine, in order to avoid permanent damage, is reduced to an emergency running mode in terms of its power output. Furthermore, as a corollary measure, as part of the operating method, as illustrated in FIG. 2, the regeneration, where possible, is constantly initiated again by means of the support program in accordance with method step I, so that the required permeability of the particle filter in the scope required for emergency driving mode can be maintained.

As illustrated under e), under certain circumstances these measures too may ultimately no longer lead to the filter loading being reduced, for example as a result of excessively high ash loading, with the result that back-pressures build up, which would ultimately prevent the internal combustion engine from operating. Accordingly, it is provided, in a further configuration of the operating method according to the invention, after the reactivation of the components in accordance with method step II and maintaining of regeneration operation on the basis of additional measures in accordance with the support program—method step I—have been performed without success, for there is to be a method step III. On the basis of a predetermined number of successful regenerations in accordance with method step I, method step III triggers a warning to the driver or to the on-board diagnosis, if appropriate in conjunction with further restrictions to operation of the internal combustion engine, since the monitoring and control steps passed through as part of the operating method as shown in FIG. 2 indicate that the exhaust-gas aftertreatment system, possibly as a result of ash loading, has exceeded a level which is critical for the gas permeability and, on account of the increase in the exhaust-gas back-pressure, may lead to unacceptable loading on the internal combustion engine.

Figure 2:
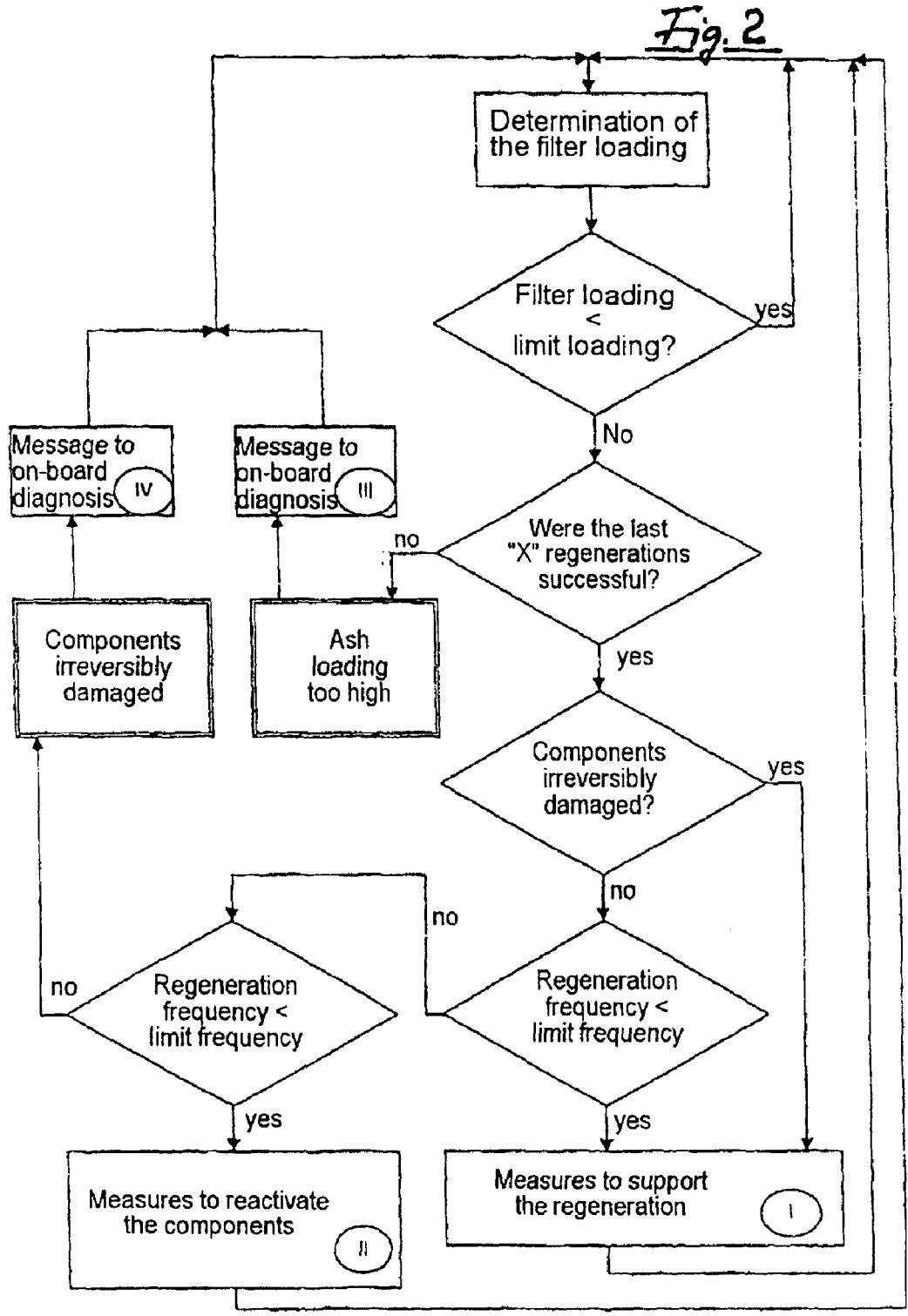
FIG. 2 is a flow diagram illustrating the operating method according to the invention, FIG. 3 schematically illustrates a device for supplying additives to fuel according to one feature of the invention, and FIG. 4 schematically illustrates a device connected downstream of an internal combustion engine for heating exhaust gas according to another feature of the invention.
Figure 3:
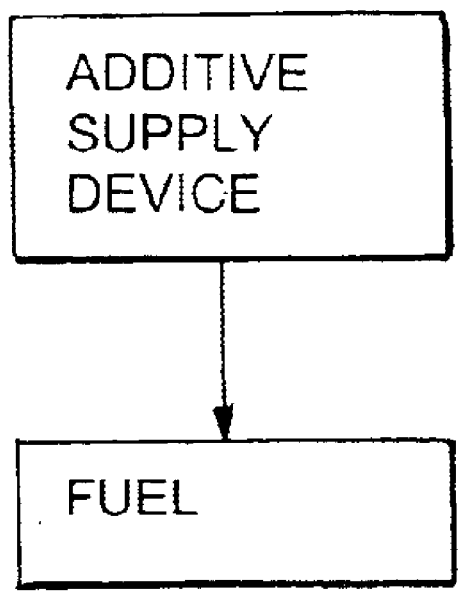
Figure 4:
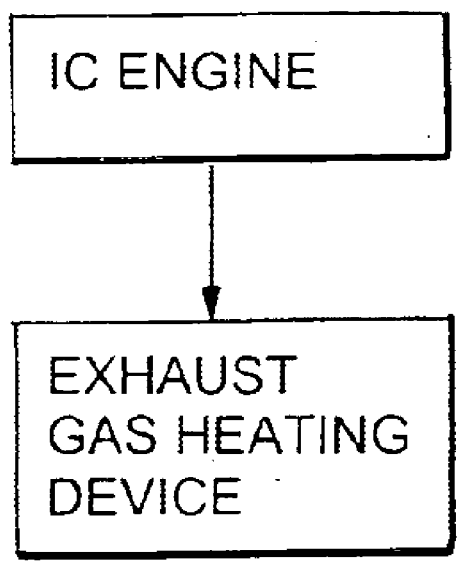

FIG. 2 provides a further illustration of the method steps which have been outlined above and may occur as part of the operating method according to the invention, on the basis of a diagrammatic and simplified flow diagram. The flow diagram also shows the effect of the method results fed in by feedback on the further sequence of the method, for example the direct activation of the support program (method step I) if it has already been established that the reactivation of the components (reactivation program—method step II) is unable to function after the method step I has been carried out successfully a number of times in succession.

In an operating method for internal combustion engines which operate with an exhaust-gas aftertreatment system, in particular diesel internal combustion engines, a plurality of operating programs are used. The first of these operating programs, as an initial stage, works on the basis of automatic regeneration. The second of these operating programs, in the event of conditions which are unfavourable for regeneration, for example on account of unfavourable driving cycles, provides measures which assist regeneration, for example by increasing the exhaust-gas temperature. The third of these operating programs, in the event of non-irreversible damage to the components of the exhaust-gas system, has the purpose of reactivating the damaged components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An operating method for an internal combustion engine which operates with an exhaust-gas aftertreatment system in which a plurality of operating programs, which can be used in a step sequence, are used for the exhaust-gas aftertreatment system operating with a particle filter, the particle filter being regenerated as a function of its loading and monitored for a limit loading being exceeded, comprising:

using a support program for regeneration of the particle filter with a temperature increase of the exhaust gases fed to the particle filter, and using a reactivation program for components which are associated with the exhaust-gas aftertreatment system in addition to the particle filter when the successive, preceding and successful activations of the support program occur at a frequency greater than a predetermined limit frequency, wherein the components which are associated with the exhaust-gas aftertreatment system for which the reactivation program is used include at least one of a catalytic coating, a fuel additive supply device, and an internal combustion engine exhaust gas heating device.

2. The operating method according to claim 1, wherein the temperature increase of the exhaust gases as part of the support program is carried out by adjusting the internal combustion engine.

3. The operating method according to claim 1, wherein the temperature increase of the exhaust gases as part of the support program is achieved by supplying external heat.

4. The operating method according to claim 2, wherein measures for increasing the temperature are used for a short time.

5. An operating method for an internal combustion engine which operates with an exhaust-gas aftertreatment system in which a plurality of operating programs, which can be used in a step sequence, are used for the exhaust-gas aftertreatment system operating with a particle filter, the particle filter being regenerated as a function of its loading and monitored for a limit loading being exceeded, comprising:

using a support program for regeneration of the particle filter with a temperature increase of the exhaust eases fed to the particle filter, and using a reactivation program for components which are associated with the exhaust-gas aftertreatment system in addition to the particle filter when the successive, preceding and successful activations of the support program occur at a frequency greater than a predetermined limit frequency, wherein the components which are associated with the exhaust-gas aftertreatment system for which the reactivation program is used include at least one of a catalytic coating of at least one of the particle filter and a CRT system, a device for supplying additives to the fuel, and a device connected downstream of the internal combustion engine for heating the exhaust gas.

6. The operating method according to claim 1, and further comprising using a control work program with regeneration of the particle filter working automatically before using the support program.

7. The operating method according to claim 1, wherein the operating method is used for continuous determination of the filter loading, and wherein, when a limit loading is exceeded, auxiliary measures for filter regeneration are initiated.

8. The operating method according to claim 1, wherein said exhaust-gas aftertreatment system is for an internal combustion engine which is operated with diesel fuel.

9. The operating method according to claim 5, wherein said CRT system comprises an oxidation catalytic converter and a particle filter.

10. The operating method according to claim 2, wherein the temperature increase of the exhaust gases as part of the support program is achieved by supplying external heat.

11. The operating method according to claim 8, wherein measures for increasing the temperature are used for a short time.

12. The operating method according to claim 3, wherein measures for increasing the temperature are used for a short time.

13. The operating method according to claim 2, and further comprising using a control work program with regeneration of the particle filter working automatically before using the support program.

14. The operating method according to claim 3, and further comprising using a control work program with regeneration of the particle filter working automatically before using the support program.

15. The operating method according to claim 4, and further comprising using a control work program with regeneration of the particle filter working automatically before using the support program.

16. The operating method according to claim 5, and further comprising using a control work program with regeneration of the particle filter working automatically before using the support program.

17. The operating method according to claim 2, wherein the operating method is used for continuous determination of the filter loading, and wherein, when a limit loading is exceeded, auxiliary measures for filter regeneration are initiated.

18. The operating method according to claim 3, wherein the operating method is used for continuous determination of the filter loading, and wherein, when a limit loading is exceeded, auxiliary measures for filter regeneration are initiated.

19. The operating method according to claim 4, wherein the operating method is used for continuous determination of the filter loading, and wherein, when a limit loading is exceeded, auxiliary measures for filter regeneration are initiated.

20. The operating method according to claim 5, wherein the operating method is used for continuous determination of the filter loading, and wherein, when a limit loading is exceeded, auxiliary measures for filter regeneration are initiated.

21. The operating method according to claim 6, wherein the operating method is used for continuous determination of the filter loading, and wherein, when a limit loading is exceeded, auxiliary measures for filter regeneration are initiated.

22. An internal combustion engine adapted to operate in accordance with the method defined by claim 1.

* * * * *